United States Patent
Lindsay et al.

(10) Patent No.: US 6,389,215 B1
(45) Date of Patent: May 14, 2002

(54) LOW BIREFRINGENT POLYIMIDES FOR OPTICAL WAVEGUIDES STATEMENT REGARDING FEDERALLY SPONSORED RESEARCH OR DEVELOPMENT

(75) Inventors: Geoffrey A. Lindsay; Andrew P. Chafin; Rena Yee; Peter Zarras, all of Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/428,459

(22) Filed: Oct. 28, 1999

(51) Int. Cl.$^7$ .................................................. G02B 6/00
(52) U.S. Cl. ........................ 385/145; 385/141; 385/144; 528/353
(58) Field of Search ................................ 385/141, 142, 385/143, 144, 145; 528/353

(56) References Cited

U.S. PATENT DOCUMENTS

| | | | |
|---|---|---|---|
| 4,603,061 A | * 7/1986 | St. Clair et al. | 427/162 |
| 4,876,330 A | * 10/1989 | Higashi et al. | 528/353 |
| 5,204,399 A | * 4/1993 | Edelman | 524/404 |
| 5,317,082 A | 5/1994 | Buehler et al. | 528/353 |
| 5,344,916 A | 9/1994 | Harris et al. | 528/353 |
| 5,572,619 A | 11/1996 | Maruo et al. | 385/143 |
| 5,598,501 A | 1/1997 | Maruo et al. | 385/143 |
| 5,649,045 A | 7/1997 | Fjare et al. | 385/145 |

OTHER PUBLICATIONS

"Lightwaves in Thin Films and Integrated Optics" by T.K. Tien, Applied Optics, 1971, vol. 10, No. 11, (pp. 2395 et. seq.).

"Molecular Design of Aromatic Polyimide Films as Uniaxial Negative Birefringent Optical Compensators in Liquid Crystal Displays" by Stephen Z.D. Cheng, Fuming Li, Edward P. Savitski and Frank W. Harris, TRIP, vol. 5, No. 2, Feb. 1997.

"Florinated Polyimide Waveguides with Low Polarization–Dependent Loss and Their Application to Thermooptic Switches" by Junya Kobayashi, Tohru Matsuura, Yasuhiro Hida, Shigekuni Sasaki and Tohru Maruno, Journ. of Lightwave Tech., vol. 10, No. 6, Jun. 1998.

"Low Loss, Buried Channel Polyimide Waveguides for Single Mode Interconnect Applications" by J.F. Valley, M. Stiller, L. Dries, E. Binkley, J. Kenney, J. Nurse, H. Fujimoto and S. Das.

"Soluble Aromatic Polyimides for Film and Coating Applications" by Anne K. St. Clair and Terry L. St. Clair, Polymers for High Technology–Electronics and Photonics, ACS Symposium Series 346, pp. 437–444.

* cited by examiner

*Primary Examiner*—Rodney Bovernick
*Assistant Examiner*—Sung Pak
(74) *Attorney, Agent, or Firm*—Anthony J. Serventi

(57) ABSTRACT

An optical waveguide subsystem, and process, having at least one cladding in contact with at least one core. The cladding has a refractive index less than the refractive index of the core. Either the cladding or core contains a crosslinked polyimide that is substantially meta-linked. The polyimide has an absolute birefringence of from about 0.01 to about zero.

26 Claims, No Drawings

LOW BIREFRINGENT POLYIMIDES FOR OPTICAL WAVEGUIDES STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not applicable.

BACKGROUND OF THE INVENTION

1. Field of the Invention

The present invention relates to polyimide compositions useful in optical waveguide structures and subsystems. More particularly, the invention relates to a polyimide film and process for making the film that are used as cladding or core in polymeric optical waveguides. Still more particularly, the polyimide cladding or core of the present invention provides high optical transparency, low birefringence, resistance to solvents, strong adhesion to solid substrates, and a high thermal stability in passive optical films.

2. Description of the Related Art

Electronic information transfer systems distribute data through electrical signals. Optical information transfer systems distribute data at high rates through photonic signals. Optical systems use optical waveguides to carry the data. Passive optical waveguides connect optical information processing devices. A glass optical fiber is a passive optical waveguide, for example. A ribbon of polymer on a glass substrate can also be a passive waveguide. Passive waveguides are used to split, combine, couple and route optical signals. These optical waveguides typically comprise a transparent core and a transparent cladding surrounding the core, with the cladding material generally having a lower index of refraction than the core material.

Desirable characteristic for optical waveguides include high optical transparency, low birefringence, resistance to solvents, strong adhesion to solid substrates, and a high thermal stability. Low optical transmission loss, including low optical absorbance and scattering, allow the optical waveguide to transfer data efficiently over large distances.

Birefringence is a measure of the difference in index of refraction between the two orthogonal polarizations that normally exist in the waveguide. Birefringence may result, in part, from the chemical structure of the polymer used in the waveguide cladding or core. For example, a linear (para substituted) chemical structure in the polymer backbone may result in orientation of the polymer chains in the plane of the film causing increased birefringence. Large birefringence is generally detrimental to waveguide performance, causing the two polarizations to have different properties, such as mode size and propagation velocity. For example, a mode size mismatch between the waveguide and the optical fiber reduces the efficiency of coupling. A difference in propagation velocity leads to dispersion of the optical signals and places an upper bound on the rate at which data may be effectively transmitted through the device. Birefringence is measured as a continuous scale with 0.0 being the ideal. Birefringence is a measure of the optical anisotropy of the waveguide. It also is normally desired to minimize the difference in birefringence between the core and cladding materials in planer waveguides. Polymer chains in flat waveguide configurations are often oriented in the plane of the film and this generally leads to negative birefringence in the film. High birefringence is normally undesirable for optical waveguides and may contribute to high optical scattering losses and dispersion. Polyimides are of interest because of their high thermal stability. Accordingly, polyimides having relatively low birefringence are especially useful in planar waveguide applications. Since polyimides generally have a stiff backbone, low birefringence is difficult to achieve.

Optical waveguides should possess high thermal stability, which permits the waveguide to endure the electronics packaging and assembly processes used in manufacturing. The optical waveguide material should also allow etching (wet or dry) of a rib in the core or of a channel in the cladding having smooth sidewalls. Additionally, it is desirable to overcoat multiple polyimide layers without degradation of the previous layers from the solvent used in the added overcoat layers.

Several patents have disclosed polyimide structures in waveguide applications. U.S. Pat. No. 5,649,045 discloses polyimide structures having increased birefringence though the use of BPDA (biphenyl dianhydride). U.S. Pat. No. 5,317,082 discloses photodefinable photosensitive copolyimides and waveguide structures thereof having a 6FDA/BTDA dianhydride component, an aromatic diamine component having bulky methyl groups ortho to the amine, and a fluorinated co-diamine component to reduce birefringence. U.S. Pat. Nos. 5,598,501 and 5,572,619 disclose electron-beam irradiation of the film to define the core region of the waveguide. U.S. Pat. No. 5,344,916 discloses polyimide and copolyimide films having negative birefringence for use in liquid crystal displays, and a method for increasing the negative birefringence by increasing the amount of PMDA (pyromellitidianhydride) in the dianhydride component. None of these patents discloses the advantages of the substantially meta-linked polyimide composition for low birefringence of the present invention.

SUMMARY OF THE INVENTION

The present invention provides an optical waveguide subsystem comprising at least one cladding in contact with at least one core, wherein the cladding has a refractive index less than the refractive index of the core, and, at least one of the cladding or the core comprises a crosslinked polyimide that is substantially meta-linked and has an absolute birefringence of from about 0.01 to about zero.

The present invention also provides a process for fabricating an optical waveguide subsystem comprising the steps of (a) forming a polyimide from about 1 mole percent to about 15 mole percent of a first diamine, wherein the first diamine possesses a crosslinkable site, from about 35 mole percent to about 49 mole percent of at least one additional diamine, wherein the combined first and additional diamines possess a substantial amount of meta-linking configuration and the combined mole percent of the first and additional diamines equals approximately 50 mole percent, and approximately 50 mole percent of a dianhydride; (b) forming a solution of from about 20 weight percent to about 50 weight percent of the formed polyimide with from about 50 weight percent to about 80 weight percent of a solvent, and optionally from about 0.5 to about 10 weight percent of a crosslinking agent; (c) filtering the formed solution through a submicron filter; (d) spin-coating the filtered solution at from about 200 rpm to about 8000 rpm to form a film on a substrate; and, (e) baking the film at a final temperature which is the higher of from about 5° C. to about 30° C. above the glass transition temperature of the polyimide or approximately about 220° C. for time period of from about 30 minutes to about 240 minutes. The polyimide may optionally be photocrosslinked.

The present invention provides crosslinked polyimide structures that are substantially meta-linked in optical waveguides for low birefringence and controllable refractive index properties. Meta-linked refers to the bond placement along the backbone of the polyimide, described below.

DETAILED DESCRIPTION OF THE INVENTION

The present invention provides optical waveguide subsystems and a process for making them. The optical waveguide subsystem comprises at least one cladding in contact with at least one core. Either the cladding or core, or both, comprises a crosslinked polyimide that is substantially meta-linked along the backbone. The cladding has a refractive index less than the refractive index of the core. The polyimide cladding, core or preferably both, has a low birefringence of from about 0.01 to about zero. With the cladding in contact with the core, additional cladding and/or core components may be included in the present invention as needed for a given purpose of the optical waveguide device.

The present invention comprises a cladding or core component that comprises a substantially meta-linked polyimide. The polyimide of the present invention is formed from the combination of diamines and dianhydride compounds. In a preferred embodiment, the crosslinked polyimide comprises approximately 50 mole percent of at least one dianhydride residue and the remainder of a first diamine residue and at least an additional diamine residue, with the first diamine residue formed from a diamine containing a crosslinking reaction site. The crosslinking reaction site on the first diamine may include, but is not limited to, hydroxyl, thiohydroxyl, acrylate, methacrylate or combinations thereof. More preferably, the first diamine residue is formed from a diamine having a crosslinking reaction site containing a hydroxyl. When the polyimide cladding comprises a first diamine residue that has been formed from a diamine compound containing an acrylate and/or methacrylate crosslinking site, the polyimide cladding may be photocrosslinked by methods determinable by those skilled in the art, such as by adding a UV sensitizer and exposing the film to UV light (actinic irradiation), or thermally crosslinked by adding a conventional free radical initiator such as a peroxide or azo compound. When the polyimide cladding comprises a first diamine residue that has been formed from a diamine compound containing a hydroxyl and/or thiohydroxyl, the polyimide cladding may be thermally crosslinked by the addition of an additive, also called a "crosslinking agent," such as an epoxy compound. In situations where the polyimide comprises either an acrylate and/or methacrylate in one diamine residue and also includes either a hydroxyl and/or thiohydroxyl in another diamine residue, the polyimide cladding may be both photocrosslinked and thermally crosslinked, if the appropriate photosensitizer and crosslinking agent are added.

Proportionately, the polyimide cladding or core of the present invention comprise a preferred amount of the first diamine residue of from about 2 mole percent to about 15 mole percent, which possess a crosslinking reaction site. At least one additional diamine residue also is preferably present. Additionally, the combined diamine residues within the formed polyimide comprise a substantial amount of meta-linked diamine residues. Preferably the polyimide comprises at least about 25 mole percent of meta-linked diamine residues, more preferably, about 40 mole percent of meta-linked diamine residues, and most preferably approximately 50 mole percent of meta-linked diamine residues. A substantial amount of meta-linked diamine residue provides the polyimide with a sufficient amount of a meta-linked components such as to lower the birefringence of the polyimide to measurements of 0.01, 0.005, 0.001, 0.0005, 0.0002 and below.

Examples of the meta-linked diamine used in forming the first diamine residue non-exclusively include such compounds as:

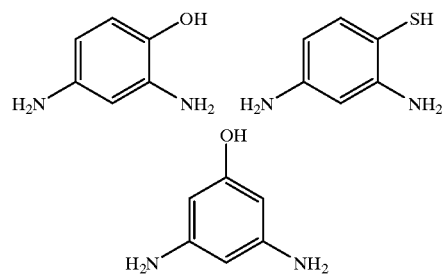

Preferably the diamine compound used to form the additional diamine residue of the present invention has a meta-linked configuration. Examples of the additional diamine of the present invention include without limitation such compounds as:

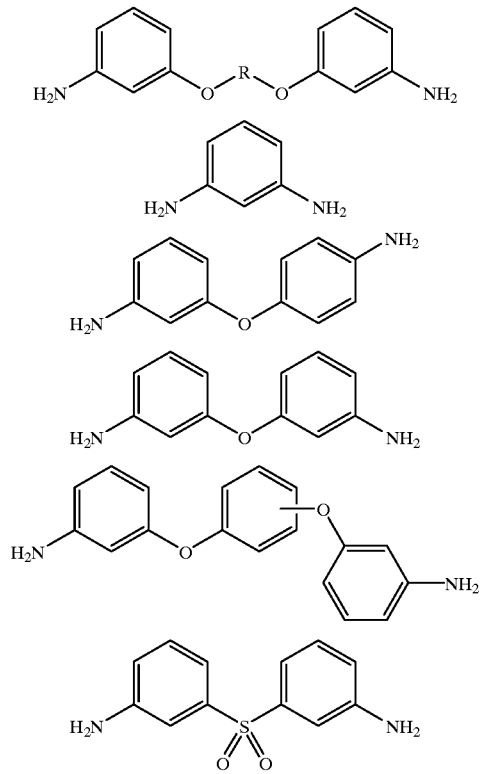

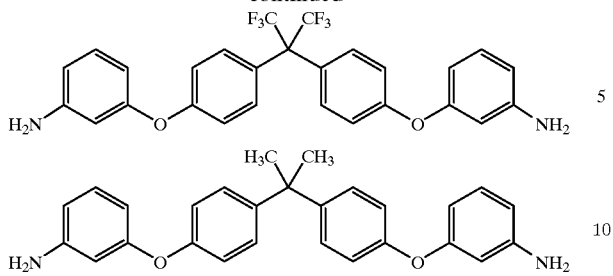

wherein R is an aliphatic hydrocarbon having from about 2 to about 12 carbon atoms, an aliphatic hydrofluorocarbon having from about 2 to about 12 carbon atoms, or a polyalkylene oxide having from about 2 to about 12 carbon atoms. Preferably, the additional diamine residue is formed from a diamine corresponding to one of the listed structures above wherein R is an aliphatic hydrocarbon containing from about 3 to about 6 carbon atoms, an aliphatic hydrofluorocarbon containing from about 4 to about 8 carbon atoms, or a polyalkylene oxide containing from about 4 to about 6 carbon atoms.

In the most preferred embodiment, the polyimide cladding of the present invention is prepared from a first diamine of the structure

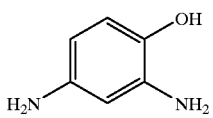

an additional diamine having the structure

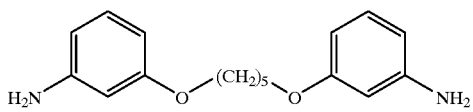

and a second additional diamine having the structure

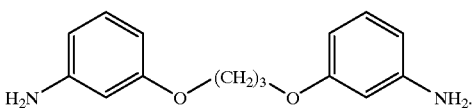

The preferred amounts of the first diamine residue range from about 2 mole percent to about 49 mole percent, more preferably from about 2.5 mole percent to about 20 mole percent, and most preferably from about 3 mole percent to about 10 mole percent. The preferred amounts of one or more additional diamine residues range from about 5 mole percent to about 48 mole percent, more preferably from about 30 mole percent to about 48 mole percent, and most preferably from about 40 mole percent to about 47 mole percent.

The polyimide is prepared from one or more tetracarboxylic acid dianhydrides, also simply called dianhydrides, in an approximately 1:1 mole ratio with the total combined amount of the first diamine and any additional diamines. The dianhydride residue present in the polyimide of the present invention is preferably formed from dianhydride compounds such as:

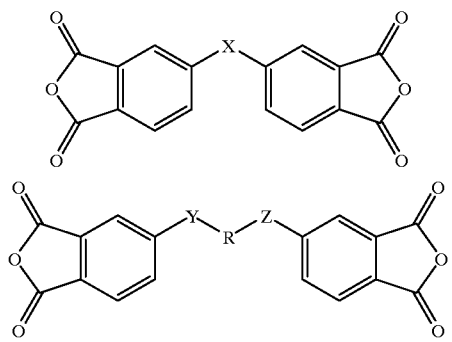

wherein X is a hexafluoro-isopropyl, sulfone, ether, thioether, or an isopropyl group; Y and Z are independently an ether, thioether, or an ester group, when R is an aliphatic or aromatic hydrocarbon having from about 2 to about 12 carbon atoms, an aliphatic hydrofluorocarbon, a fluorocarbon having from about 2 to about 12 carbon atoms, a polyalkylene oxide having from about 4 to about 8 carbon atoms; and Y and Z are independently hexafluoro-isopropyl, sulfone, ether, thioether, or isopropyl groups, when R is an aromatic hydrocarbon. The dianhydrides are not formed from BPDA, PMDA, and the like which increase the birefringence of the polyimide.

Generally, the total diamine and total dianhydride components are present in a molar ratio of approximately 1:1. The chain length may preferably be restricted by adding a predetermined quantity of a monoamine or a dicarboxylic acid anhydride to the reaction mixture. As is well known by those skilled in the art, the diamine and dianhydride are mixed together in a dry solvent at room temperature for several hours to form a poly(amic acid). This reaction mixture is then heated to about 170° C. for several hours to form the polyimide. The reaction for the formation of the polyimide from the polyamine acid generally takes place at from about 160° C. to about 300° C. Normal precautions involving the use of dry solvents and monomers and the removal of water formed during the condensation reaction will lead to an increased molecular weight, which is normally desirable.

When desired, the polyimide may also be blended with a crosslinking agent. The blending may be done in a solvent at room temperature. Crosslinking agents such as epoxide compounds, e.g., diglycidyl ether of bisphenol A; oxazoline compounds, e.g., 1,3-phenylene dioxazolene; and isocyanate compounds, e.g., toluene diisocyanate, may be used. These compounds generally have two or more reactive groups.

The refractive index of polyimide cladding or core measured with light having a wavelength of 1.3 microns is preferably from about 1.45 to about 1.65, more preferably from about 1.50 to about 1.62, and most preferably from about 1.55 to about 1.61. The refractive index is controllable with the selection of the meta-linked diamines residues and dianhydrides residues within the polyimide. The refractive index may be lowered by the incorporation of specific diamines and/or dianhydrides in the polyimide, with the selection of particular diamines and/or dianhydrides being determinable by those skilled in the art, such as fluoro-containing monomers and aliphatic-containing monomers. Conversely, aromatic monomers increase the refractive index.

A controllable, or adjustable, cladding or core refractive index is desirable, given that it does not substantially change the birefringence or increase light scattering. In controlling the refractive index of the cladding or core, the polyimide composition of the cladding may be varied to suit a variety of different core materials that possess different refractive indices, and the core may be varied to suit a variety of different cladding materials that possess different refractive indices. The refractive index of the polyimides of the present invention can be controlled by selection of the types and amounts of meta-linked diamines and/or dianhydrides. Controllable refractive index and birefringence of the optical waveguide provide a flexibility in the most efficient use of a waveguide. The controllable polyimide layers permit construction of a specific refractive index ratio between the core material and the cladding material of the present invention.

In addition to controllable birefringence and refractive index, the polyimide cladding and/or core of the present invention provide thermal stability, increased solvent resistance, and low optical loss. Thermal stability of the polyimide cladding allows the present invention to be used in a variety environmental conditions. Low optical loss of the core and/or cladding of the present invention decreases the amount of energy required to sending a signal through a waveguide incorporating the present invention.

An optical waveguide subsystem as described herein may be fabricated by the process having the steps of (a) forming a polyimide from about 2 mole percent to about 15 mole percent of a first diamine, wherein the first diamine possesses a crosslinkable site, from about 35 mole percent to about 48 mole percent of at least one additional diamine, wherein the combined first and additional diamines possess a substantial amount of meta-linking configuration and the combined mole percent of the first and additional diamines equals approximately 50 mole percent, and approximately 50 mole percent of a dianhydride; (b) forming a solution of from about 20 weight percent to about 50 weight percent of the formed polyimide with from about 50 weight percent to about 80 weight percent of a solvent, and optionally from about 0.5 to about 10 weight percent of a crosslinking agent; (c) filtering the formed solution through a submicron filter; (d) spin-coating the filtered solution at from about 200 rpm to about 8000 rpm to form a film on a substrate; and, (e) baking the film at a final temperature which is the higher of from about 5° C. to about 30° C. above the glass transition temperature of the polyimide or approximately about 220° C. for time period of from about 30 minutes to about 240 minutes. It is understood by those skilled in the art that in order to remove solvent from the film without forming bubbles or cracks before the final baking temperature, the film must be baked at lower temperatures for various lengths of time. The exact time-temperature process is determined for each sample in order to eliminate pinholes and blisters.

There are many solvents suitable for spin-coating the polyimide on a substrate that may be used for the present invention. Exemplary solvents non-exclusive include N-methyl pyrrolidinone (NMP), dimethylformamide (DMF), dimethyl acetamide, diglyme, ethyl lactate, and/or combinations thereof.

When the cladding comprises the crosslinked polyimide of the present invention, it may be used in combination with other waveguide materials. Accordingly, the core material may be a polymer, an inorganic glass, a semiconductor, and/or other like materials. Alternatively, the core materials can be polyimides of the present invention wherein the composition of the respective polyimides is such that the core polyimide has a higher refractive index than the cladding, and the cladding may be a polymer, an inorganic glass, a semiconductor, and/or other like materials.

Other additives may also be added to the polyimide depending on the purpose and the end use of the polyimide core or cladding. Examples of these include antioxidants, photostabilizers, volume expanders, dyes, free radical scavengers, free radical initiators, catalysts for crosslinking, contrast enhancers, nitrones, and UV absorbers and sensitizers. Additives may be included in amounts of from about 0 wt % to about 6 wt %, preferably from about 0.1 wt % to about 1 wt %. The additive should not phase-separate from the polyimide, as this may form optical scattering sites.

The present invention maybe formed on the surface of a suitable substrate. The substrate may be any material on which it is desired to establish a waveguide including semiconductor materials such as silicon, germanium, zinc selenide, aluminum nitride, silicon dioxide, gallium arsenide, silicon nitride, glass, quartz, plastics, ceramics, gold, crystalline materials and the like. The substrate may or may not contain other devices, either topographical features such as grooves or electrical circuits or electro-optic or photovoltaic devices such as photo detectors. For devices where the light transmissive region is an organic layer of lower refractive index than the substrate material, it is necessary to first place another layer of material having a refractive index lower than the refractive index of the waveguide material between the substrate and waveguide. Such a layer is known in the art as a buffer layer or a cladding layer and may be comprised of, for example, a semiconductor oxide, a lower refractive index polymer or a spin-on silicon dioxide glass material.

The present invention may be used in either a slab, rib or channel waveguide. A slab waveguide is one in which the optical wave is confirmed only to the plane of the film. Channel and rib waveguides are those in which the optical wave is also confined laterally within the film.

Channel or rib structures are necessary for many passive and electro-optic devices because they allow the light to be directed to certain areas of the substrate as well as providing a mechanism for splitting, combining optical waves and coupling light from the waveguide to optical fibers.

EXAMPLE I

Preparation of a typical meta-linked diamine, 1,3-Bis(3-aminophenoxy)propane, for use in the polyimides of the present invention was completed as follows. 3-Acetamidophenol (77.92 g, 0.5155 mol, 97%) was dissolved in 1 L of absolute ethanol and filtered to remove a small amount of fine particulates. To this solution was added a 21 wt % solution of sodium ethoxide in ethanol (163.70 g, 0.505 mol), and the mixture was stirred for 2 hours. 1,3-dibromopropane (49.69 g, 0.246 mol, 98%) was added to the stirred mixture, and refluxed overnight with a Drierite drying tube atop the condenser. After 19 hours of reflux, another 3.8 mL of 21% NaOEt (0.010 mol) was added, and reflux continued. After 24 hours of total reflux time, approximately half of the ethanol was removed by rotary evaporation. An equal volume of water was added, producing white solid which was filtered off and transferred to a 2-L round-bottom flask; 500 mL of 95% EtOH and 500 mL conc. HCl were added, and the mixture was refluxed overnight. The solution was cooled in an ice bath, and the precipitate was filtered off. The solid was transferred to 1 L of water, and 10 N NaOH was added until the solution was basic. The resulting white solid was filtered off, washed with water, and dried in a vacuum oven. The solid was recrystallized from methanol and then dried under vacuum at 85–90° C.; yield, 35.52 g (57% overall based on 1,3-dibromopropane); mp 142–144° C.

EXAMPLE II

Preparation of a typical polyimide of the present invention was completed as follows. A 500 mL round bottom flask was charged with 170 mL NMP. Added to this solvent was the 1,3-bis(4-aminophenoxy)propane from Example I (3.3 g, 12.7 mmol), 1,5-bis(4-aminophenoxy)pentane (9.23 g, 32.2 mmol), ethylene glycol bis(anhydro-trimellitate) (20.0 g 48.8 mmol), and silated 2,4-diamino phenol (1.3 g, 3.9 mmol). Silylation of the diamine was accomplished by reacting its dihydrochloride salt (30 g, 152 mmol) with excess hexamethyldisilazane (200 mL) and heating at reflux overnight. Excess hexamethyldisilazane was removed at 25 torr and the residue then distilled at 0.1 torr. The fraction boiling at 118°–120° C. was collected to gave 47.45 g of a clear thick liquid (92% yield). All monomers dissolved immediately into the solvent to obtain a homogenous red/orange solution. The contents were stirred at room temperature under a positive nitrogen blanket for 12 hours. Upon completion of the poly(amic acid) formation, the contents of the round bottom flask were placed in an oil bath maintained at 170° C. for 6 hours under a continuous stream of positive nitrogen pressure with vigorous mixing. After 6 hours of imidization the contents were homogenous, brown in color and slightly viscous. The contents of the round bottom flask were cooled to room temperature and precipitated slowly into 1 L of absolute ethanol (0.2 mL concentrated hydrogen chloride (33 wt %) added to adjust pH <6.5). The resulting polymer suspension was filtered through a medium porosity glass frit and the polymer residue was washed 2×with absolute ethanol. The polymer residue was dried in a vacuum dessicator at 0.05 Torr, 25° C. for 2 days. The polyimide is obtained as an off-white/beige colored powder in nearly quantitative yield. It was determined by thermogravimetric analysis that the powder thus obtained contains 8.5 percent by weight trapped NMP solvent which must be accounted for in weighing out the sample for the spin-coating solution. In order to completely remove the NMP solvent, the polymer must be baked above the glass transition temperature ($T_g$=130° C.).

EXAMPLE III

Preparation of a typical polyimide film of the present invention was completed as follows. Samples and equipment were handled in a Class 100 clean room. A sample of solid powdered polyimide from Example II was weighed into a screw-top bottle and NMP solvent was added to bring the polymer concentration to about 45%. The solution was stirred with a magnetic stirring bar at room temperature until the polymer appeared to have gone completely into solution (several hours). The crosslinking agent, 4,4'-methylenebis (N,N'-diglycidylaniline), was dissolved in NMP solvent making up a 50% solution. Enough of this solution of crosslinking agent was added to the polymer solution to give a final solution containing 2.7 weight percent of the crosslinking agent based on the weight of the polymer. After further mixing, this final solution was poured into a syringe equipped with a 0.5-micron membrane filter, and was filtered into another screw-top bottle. The contents of the bottle were poured onto a glass slide on the spin-coating equipment. The sample was spun for about 10 seconds at 200 rpm, and then 70 seconds at 4000 rpm. This film was removed and placed on a hot plate at about 60° C. for 20 minutes, then at 150° C. for 20 minutes, and the final bake at 250° C. for 120 minutes. The film was covered with flowing nitrogen throughout the drying steps. The film was cooled to room temperature before the sample was removed for testing. The film thickness was 3.7 microns.

EXAMPLE IV

Measurement of the birefringence was completed as follows. The index of refraction and birefringence of the film from Example III was analyzed by the prism-coupling method disclosed in "Lightwaves in Thin Films and Integrated Optics," by T. K. Tien, in the publication Applied Optics, 1971, Vol. 10, No. 11, (see pages 2395 et. seq.), the disclosure of which is herein incorporated by reference. Measured at 1.3 microns (using a Nd:YAG laser) the index of refraction in the plane of the film (nTE) was 1.6012 and the index of refraction normal to the film (nTM) was 1.5982. Hence, the birefringence (nTE−nTM) was 0.003.

It should be understood that the foregoing summary, detailed description, and examples of the invention are not intended to be limiting, but are only exemplary of the inventive features, which are defined in the claims.

What is claimed is:

1. An optical waveguide subsystem comprising:
   at least one cladding in contact with at least one core, wherein the cladding has a refractive index less than the refractive index of the core; and,
   at least one of the cladding or the core comprises a crosslinked polyimide that is substantially meta-linked and has an absolute birefringence of from about 0.005 to about zero,
   wherein the polyimide comprises approximately 50 mole percent of at least one dianhydride residue and approximately 50 mole percent of a first diamine residue and at least an additional diamine residue, the first diamine residue formed from a diamine containing a crosslinkable reaction site.

2. The optical waveguide subsystem of claim 1, wherein the at least one of the polyimide cladding or core has an absolute birefringence of from about 0.001 to about zero.

3. The optical waveguide subsystem of claim 1, wherein the at least one of the polyimide cladding or core has an absolute birefringence of from about 0.0005 to about zero.

4. The optical waveguide subsystem of claim 1, wherein the at least one of the polyimide cladding or core has an absolute birefringence of from about 0.0002 to about zero.

5. The optical waveguide subsystem of claim 1, wherein the dianhydride residue is formed from a dianhydride selected from the group consisting of

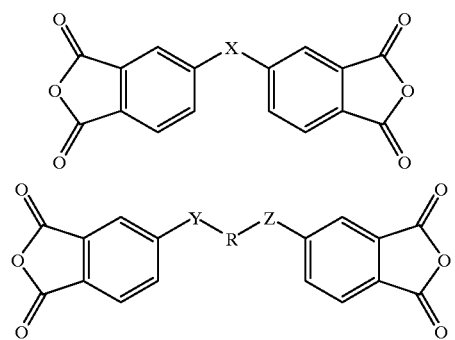

and combinations thereof; and,
   wherein X is a hexafluoro-isopropyl, sulfone, ether, thioether, or an isopropyl group; Y and Z are independently an ether, thioether, or an ester group, when R is an aliphatic or aromatic hydrocarbon having from about 2 to about 12 carbon atoms, an aliphatic hydrofluorocarbon, a fluorocarbon having from about 2 to about 12 carbon atoms, a polyalkylene oxide having from about 4 to about 8 carbon atoms; and Y and Z are independently hexafluoro-isopropyl, sulfone, ether, thioether, or isopropyl groups, when R is an aromatic hydrocarbon.

6. The optical waveguide subsystem of claim 1, wherein the polyimide comprises from about 2 mole percent to about 15 mole percent of the first diamine residue.

7. The optical waveguide subsystem of claim 1, wherein the first diamine residue is formed from a meta-linked diamine selected from the group consisting

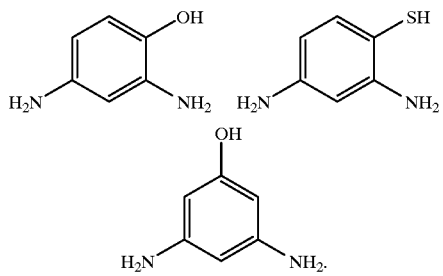

8. The optical waveguide subsystem of claim 1, wherein the refractive index of the polyimide measured with light having a wavelength of 1.3 microns is from about 1.45 to about 1.65.

9. The optical waveguide subsystem of claim 1, wherein the core comprises a crosslinked polyimide.

10. The optical waveguide subsystem of claim 1, wherein the cladding comprises a crosslinked polyimide.

11. The optical waveguide subsystem of claim 1, wherein the first diamine residue is formed from a diamine containing a reaction site selected from the group consisting of hydroxyl, thiohydroxyl, acrylate, methacrylate and combinations thereof.

12. The optical waveguide subsystem of claim 11, wherein the polyimide comprises the first diamine residue formed from a diamine containing a crosslinking site selected from the group consisting of acrylate and methacrylate, wherein the polyimide has been photo crosslinked by means of a photo sensitizer and actinic irradiation.

13. The optical waveguide subsystem of claim 11, wherein the polyimide comprises the first diamine residue formed from a diamine containing a crosslinking site selected from the group consisting of acrylate and methacrylate, wherein the polyimide is thermally-crosslinked by means of a free radical crosslinking initiator.

14. The optical waveguide subsystem of claim 11, wherein the first diamine residue was formed from a diamine containing a reaction site selected from the group consisting of hydroxyl, thiohydroxyl, and combinations thereof, wherein a crosslinking agent has been added that has been thermally crosslinked with the polyimide.

15. The optical waveguide subsystem of claim 14, wherein the crosslinking agent contains greater than one reactive functional group selected from the group consisting of epoxide, oxazoline, and isocyanate.

16. The optical waveguide subsystem of claim 1, wherein the polyimide comprises at least 25 mole percent of meta-linked diamine residues.

17. The optical waveguide subsystem of claim 16, wherein the polyimide comprises at least 40 mole percent of meta-linked diamine residues.

18. The optical waveguide subsystem of claim 17, wherein the polyimide comprises approximately 50 mole percent of meta-linked diamine residues.

19. The optical waveguide subsystem of claim 1, wherein at least an additional diamine residue is formed from a meta-linked diamine selected from the group consisting of

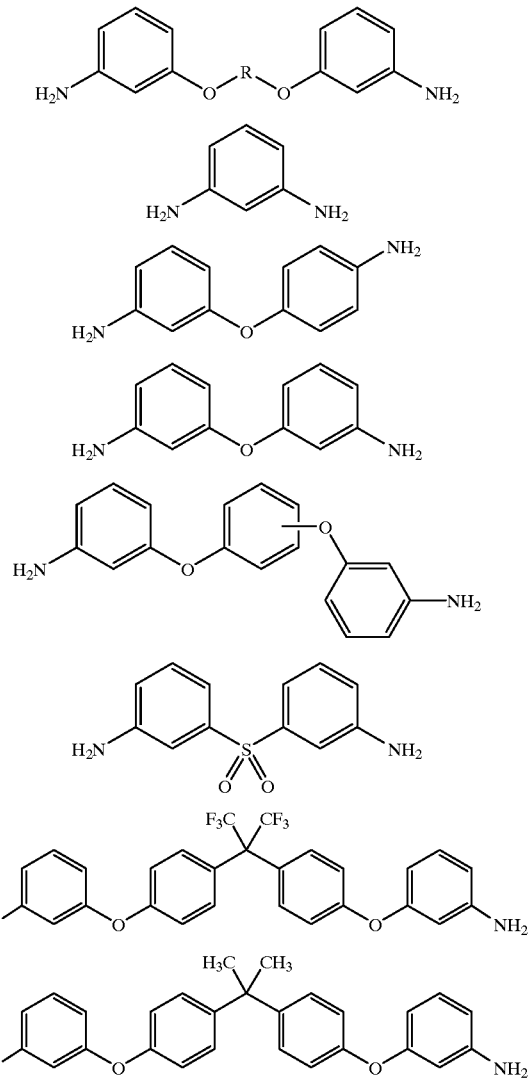

wherein R is an aliphatic hydrocarbon having from about 2 to about 12 carbon atoms, an aliphatic hydrofluorocarbon having from about 2 to about 12 carbon atoms, or a polyalkylene oxide having from about 4 to about 12 carbon atoms.

20. The optical waveguide subsystem of claim 19, wherein R is an aliphatic hydrocarbon containing from about 3 to about 6 carbon atoms, an aliphatic hydrofluorocarbon containing from about 4 to about 8 carbon atoms, or a polyalkylene oxide containing from about 4 to about 6 carbon atoms.

21. The optical waveguide subsystem of claim 19, wherein the polyimide comprises a composition formed from:

(a) a first diamine of the structure

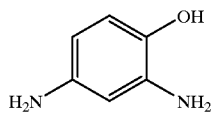

(b) an additional diamine having the structure

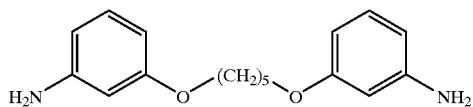

and, (c) a second additional diamine having the structure

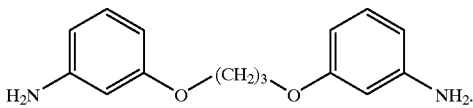

22. The optical waveguide subsystem of claim 21, wherein the polyimide comprises the first diamine residue in an amount of from about 2 mole percent to about 6 mole percent, the additional diamine residue in an amount of from about 30 mole percent to about 36 mole percent, and the second additional diamine residue in an amount of from about 8 mole percent to about 18 mole percent.

23. A process for fabricating an optical waveguide subsystem comprising the steps of:

(a) forming a polyimide from about 2 mole percent to about 15 mole percent of a first diamine, wherein the first diamine possesses a crosslinkable site, from about 35 mole percent to about 48 mole percent of at least one additional diamine, wherein the combined first and additional diamines possess a substantial amount of meta-linking configuration and the combined mole percent of the first and additional diamines equals approximately 50 mole percent, and approximately 50 mole percent of a dianhydride;

(b) forming-a solution of from about 20 weight percent to about 50 weight percent of the formed polyimide with from about 50 weight percent to about 80 weight percent of a solvent, and optionally from about 0.5 to about 10 weight percent of a crosslinking agent;

(c) filtering the formed solution through a submicron filter;

(d) spin-coating the filtered solution at from about 200 rpm to about 8000 rpm to form a film on a substrate; and, (e) baking the film at a final temperature which is the higher of from about 5° C. to about 30° C. above the glass transition temperature of the polyimide or approximately about 220° C. for a time period of from about 30 minutes to about 240 minutes.

24. The optical waveguide subsystem of claim 23, wherein the crosslinking agent is present.

25. The optical waveguide subsystem of claim 23, wherein the polyimide is crosslinked by irradiating the film with UV-visible light.

26. The optical waveguide subsystem of claim 23, further comprising the step of silating the diamines prior to forming the polyimide.

* * * * *